United States Patent [19]

Newberg et al.

[11] Patent Number: 5,109,449

[45] Date of Patent: Apr. 28, 1992

[54] VARIABLE OPTICAL FIBER DELAY LINE

[75] Inventors: Irwin L. Newberg, Northridge; Gregory L. Tanagonan, Oxnard, both of Calif.

[73] Assignee: Hughes Aircraft Company, Los Angeles, Calif.

[21] Appl. No.: 647,673

[22] Filed: Jan. 25, 1991

Related U.S. Application Data

[63] Continuation of Ser. No. 329,145, Mar. 27, 1989, abandoned.

[51] Int. Cl.[5] ............................ G02B 6/26; G02F 1/00; H01P 3/00; H01J 5/16
[52] U.S. Cl. ........................................ 385/46; 385/2; 385/24; 385/31; 385/49; 333/164; 250/227.11; 250/551; 359/173
[58] Field of Search ............... 350/96.13, 96.14, 96.15, 350/96.16, 96.20, 96.29; 250/227.11, 551; 455/601, 602, 606, 607, 609, 610, 611, 612, 613, 617; 342/374, 375; 333/164

[56] References Cited

U.S. PATENT DOCUMENTS

| | | | |
|---|---|---|---|
| 4,028,702 | 6/1977 | Levine | 342/374 |
| 4,671,605 | 6/1987 | Soref | 350/96.15 |
| 4,676,585 | 6/1987 | Shaw et al. | 350/96.15 |
| 4,723,827 | 2/1988 | Shaw et al. | 350/96.15 |
| 4,736,463 | 4/1988 | Chavez | 455/606 |
| 4,997,249 | 3/1991 | Berry et al. | 350/96.15 |
| 5,014,023 | 5/1991 | Mantele | 333/164 |

*Primary Examiner*—Brian Healy
*Attorney, Agent, or Firm*—Leonard A. Alkov; Wanda K. Denson-Low

[57] ABSTRACT

A variable delay line has a first optical fiber to transmit an optical signal and a plurality of second optical fibers adapted to receive simultaneously the optical signal from the first fiber. Each second fiber has a predetermined length, the length of each second fiber being different from each other second fiber. The predetermined length determines the propagation delay of the optical signal along each second fiber. An opto-electronic switch is made responsive to the optical energy on a selected one of the second fibers. The switch detects the delayed optical energy and couples the delayed optical energy on an electrical analog thereof to a device. The selected second fiber is chosen for the propagation delay associated therewith.

39 Claims, 6 Drawing Sheets

VARIABLE OPTICAL FIBER DELAY LINE

This is a continuation of application Ser. No. 07/329,145 filed Mar. 27, 1989, now abandoned.

BACKGROUND OF THE INVENTION

1. Field of the Invention

The present invention relates generally to delay lines and more particularly to a novel optical fiber delay line.

2. Description of Related Art

In various types of signal processing, it is desirable to obtain a true time delay of the signal being processed. For example, radar systems, electronic antenna beam steering systems and clutter rejection filters all require the use of delay lines. In radio frequency (RF) systems, prior art delay lines exemplarily include quartz, surface acoustic wave (SAW), coaxial and microstrip waveguide, and digital delay lines.

For example, a typical SAW delay line has a piezoelectric crystal substrate. On the surface of the substrate are input and output interdigitating fingers. Excitation of the input fingers with an RF signal develops a mechanical wave on the surface of the substrate. The surface wave travels to the output fingers where an output voltage is developed. In the SAW device, the propagation delay is determined by the spacing between the input and output fingers. To achieve useful time delays required in many RF systems, the spacing between the input and output fingers is usually a few orders of magnitude larger than the wavelength of the propagating wave. Since propagating waves decay as an exponential function of the ratio of propagation distance to wavelength, a significant disadvantage of and limitation of the SAW device is its high insertion loss from the decay of the mechanical wave. A typical SAW device insertion loss may typically be in the order of 100 db depending on the desired delay.

Furthermore, the interstitial spacing between the fingers of each of the input and output fingers determines the resonant wavelength of the surface wave and the number of fingers determines the relative efficiency of the electro-mechanical coupling. Since a relatively large number of interspaced fingers are required to minimize the electro-mechanical coupling loss, the relatively large number of fingers makes the SAW device highly frequency selective about the resonant frequency. Therefore, a further disadvantage and limitation of the SAW delay line is the small frequency range over which the device will operate. Obviously, reducing the number of interspaced fingers decreases the frequency selectivity but disadvantageously increase electro-mechanical coupling losses.

Therefore, it is apparent that a SAW delay line can operate only in a narrow frequency band with high insertion loss. Yet another disadvantage and limitation of the SAW delay line is that, after the mechanical wave passes through the output fingers and reaches the edge of the substrate, it is reflected back to the output fingers which may cause echoes in the delayed output signal.

It is also highly desirable to provide a variable delay line. As described hereinabove, the delay of the SAW delay line is determined solely by the fabricated spacing between the input and output fingers on the surface of the substrate. For achieving a variable delay using SAW devices, many such substrates, each substrate having a different length between the input and output fingers, need to be used for each delay line. To fabricate two delay lines on a single substrate would cause mechanical waves to couple and interfere with each other.

Digital delay lines overcome some of the limitations and disadvantages of the saw and quartz delay lines, such as insertion and coupling losses and variability of delay, and are particularly useful when very long delays of an RF signal are needed. A digital delay line mixes the RF signal with a lower frequency signal to obtain an in-phase and quadrature data. The data is then mixed back up to the original signal frequency. A significant disadvantage and limitation of the digital delay is that it requires extensive hardware, and the mixing of signals may introduce other spurious signals. A further disadvantage and limitation of the digital delay line is that, since it operates at radio frequencies, it is highly susceptible to electro-magnetic interference (EMI). Also, stray propagation along ground loops may cause crosstalk in the digital delay line.

SUMMARY OF THE INVENTION

Accordingly, a feature of the present invention is to provide an apparatus which overcomes one or more disadvantages or limitations of the prior art. Another feature of the present invention is to provide apparatus which exhibits a variable delay. A further feature of the present invention is to provide such a variable delay line which exhibits relatively low (compared to other types of delay lines) insertion loss, high resolution, fast switching speeds and high isolation. Yet another feature of the present invention is that insertion loss is independent of or constant with frequency to provide a delay with wide bandwidth.

According to the present invention, a variable delay line comprises an optical medium such as a first optical fiber to transmit an optical signal and a plurality of second optical fibers adapted to receive simultaneously the optical signal from the first fiber. Each second fiber has a predetermined length, the length of each second fiber being different from each other second fiber. The predetermined length determines the propagation delay of the optical signal along each second fiber. The variable delay line further comprises means for coupling the optical signal from a selected second fiber to a device which utilizes either the optical signal or electrical analog thereof. The selected second fiber is chosen for the propagation delay associated therewith.

In one particular embodiment, the present invention is particularly useful as an RF delay line. The RF signal is used to modulate an optical signal. The optical signal is variably delayed, according to the principles of the present invention, and demodulated to develop a delayed RF signal therefrom.

An advantage of the present invention is that it provides a variable true time delay and not a phase shift, this advantage being important in antenna beam steering systems. By utilizing optical fibers, other advantages over the prior art include the ability to provide long delays of several microseconds. Furthermore, an optical fiber delay line has the further advantage of having wide bandwidth, low cost, small size and weight, and no susceptibility to (EMI). Furthermore, the optics eliminate ground loops resulting in a lack of cross talk and provides high isolation.

These and other advantages and features of the present invention will become apparent from the following description of the exemplary preferred embodiment when read in conjunction with the attached drawings and appended claims.

DESCRIPTION OF AN EXEMPLARY PREFERRED EMBODIMENT

Figure 1:
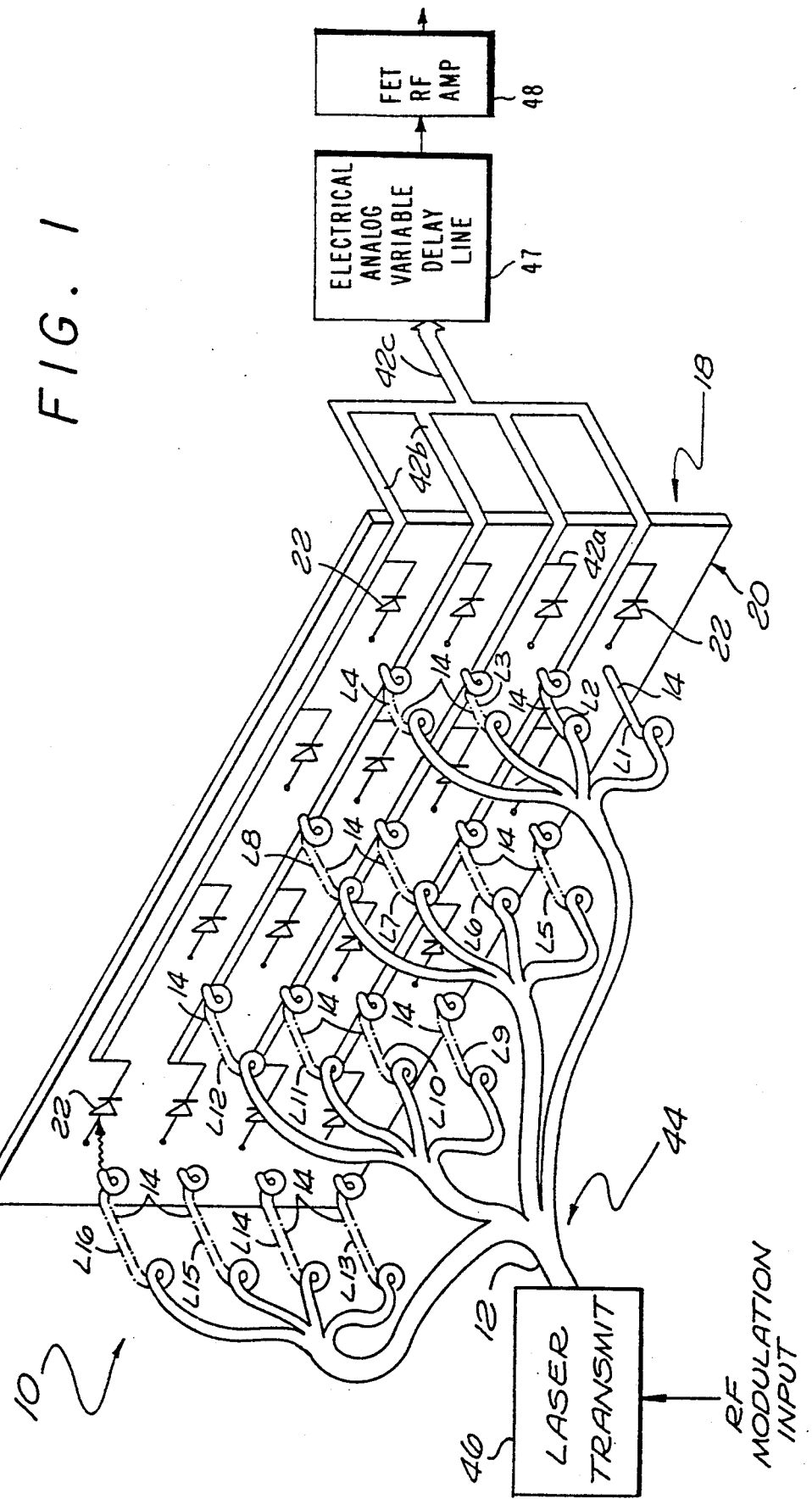
FIG. 1 is a schematic representation of a variable delay line constructed according to the principles of the present invention.
Figure 2:
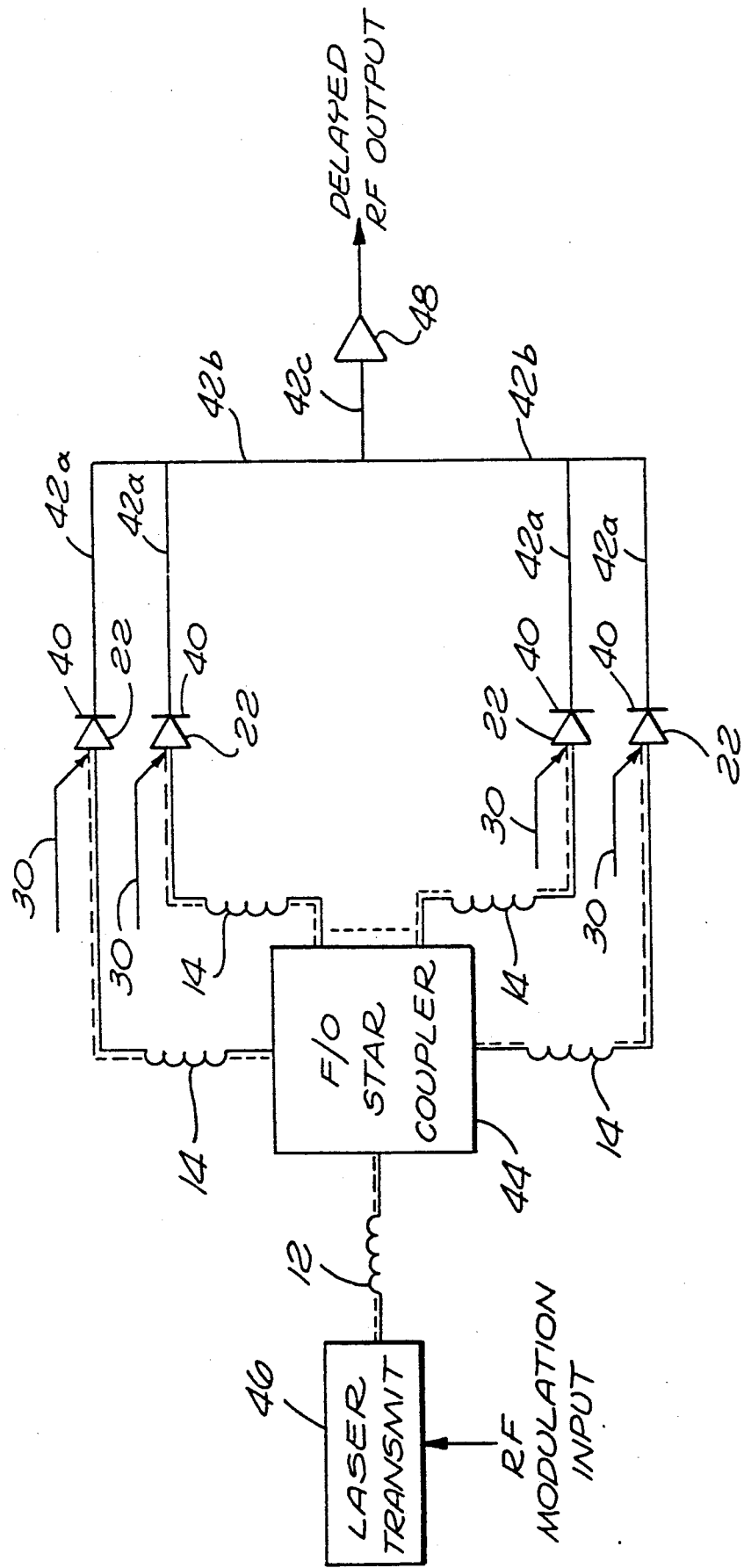
FIG. 2 is a schematic block diagram of a portion of the delay line shown in FIG. 1.
Figure 3:
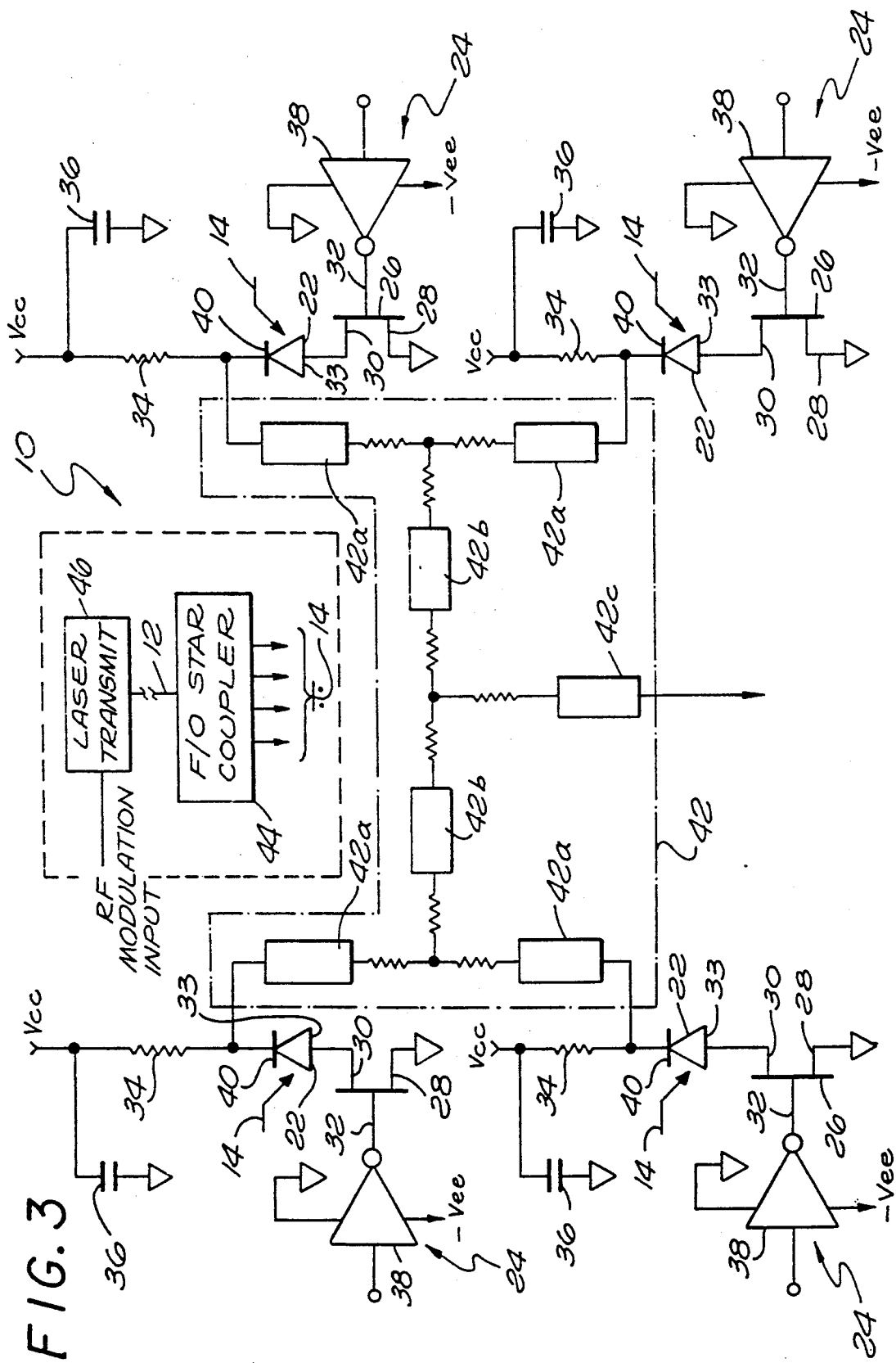
FIG. 3 is a more detailed schematic circuit diagram of the electrical portion of the delay line of FIG. 2.

Referring now to FIGS. 1-3, there is shown a variable optical delay line 10 constructed according to the principles of the present invention. The delay line 10 includes a first optical fiber 12 to transmit an optical signal and a plurality of second optical fibers 14 adapted to receive the optical signal from the first optical fiber 12. Each of the second optical fibers 14 has a predetermined length, indicated generally as $L_1$-$L_{16}$ wherein the length of each second fiber 14 is different from the length of all other second fibers 14. It should be recognized by those skilled in the art that the predetermined length of each second optical fiber 14 determines the propagation delay of the optical signal along the respective second optical fiber 14. Although a preferred embodiment of the present invention is described as including optical fiber, any optical transmission medium is within the scope of practicing the present invention.

The variable delay line 10 further includes means 18 for coupling the optical signal from a selected one of the second optical fibers 14 to a device which utilizes either the optical signal or an electrical analog of the optical signal. As used herein, an electric analog of the optical signal is an electrical signal which conveys identical information as the optical signal. The selected second optical fiber 14 is selected in accordance with the propagation delay associated therewith. In one embodiment of the present invention, coupling means 18 includes opto-electric switching means 20 for developing an electrical signal from the optical signal received from the selected second optical fiber 14.

With particular reference to FIGS. 2 and 3, opto-electric switching means 20 includes a plurality of photodiodes 22, each of the photodiodes 22 being associated with respective one of the second optical fibers 14. One of the photodiodes 22 develops the above-described electrical signal when made responsive to the optical signal on the selected one of the second optical fibers 14 associated therewith.

Accordingly, opto-electric switching means 20 further includes control means 24 for enabling the photodiode 22 associated with the selected second optical fiber 14 to be responsive to the optical signal thereon. Control means 24 includes a plurality of transistor switches 26 as best seen in FIG. 3. Each of the transistor switches 26 is operatively coupled to a respective one of the photodiodes 22. The transistor switch 26 is selectively turned on by a control signal which identifies the selected one of the second optical fibers 14. When a selected transistor switch 26 is turned on, it electrically reverse biases the photodiode 22 to make it responsive to optical energy. Otherwise, the potential of the photodiode 22 "floats" when the transistor switch 26 is turned off preventing any current therethrough. Thus one function of each photodiode 22 is to operate as an electrically controlled optical switch.

In one embodiment of the present invention, each transistor switch 26 is a depletion mode FET having a source 28, a drain 30 and a gate 32. The source 28 is coupled to ground and the drain 30 is coupled to an anode 33 of the photodiode 22. Control means 24 further includes a resistor 34, a capacitor 36 and an invertor 38. The resistor 34 is coupled between a positive source voltage, $V_{cc}$, and a cathode 40 of the photodiode 22 to limit the DC bias current therethrough when the associated FET transistor switch is turned on and to block any RF signal developed by the photodiode 22. The capacitor 36 is coupled between the source voltage, $V_{cc}$, and ground. The control signal is applied to the gate 32 of the FET transistor switch 26 through the invertor 38 to provide a gate voltage swing between ground and a negative source voltage, $-V_{ee}$, at its output. For example, $V_{cc}$ may be +10 v and $-V_{cc}$ may be −5 v.

When the source 30 of the selected FET switch 26 electrically reverse biases the photodiode 22 associated therewith, the optical signal from the selected second optical fiber 14 incident upon the photodiode 22 is a modulated DC current. This modulation of the DC current with a varying RF component is the electrical signal developed by the electro-optic switching means 20. Therefore, a second function of the photodiode 22 is to demodulate the optical signal incident thereon to develop the electrical signal. The second function of the photodiode 22 is particularly useful when using the variable optical delay line 10 in an RF delay line as described hereinbelow.

Opto-electric switching means 20 also includes a transmission line 42. The transmission line 42 includes a plurality of first segments 42a, a plurality of second segments 42b and an output segment 42c. Each first segment 42a is coupled between the cathode 40 of a respective one of the photodiodes 22 and one second segment 42b. The output segment 42c terminates each second segment 42b. Each first segment 42a, second segment 42b and output segment 42c are impedance matched to each other.

To couple the optical signal from the first optical fiber 12 to the second optical fibers 14, the delay line 10 further includes a 1:N optical fiber coupler 44, such as a star coupler, operatively coupled between the first optical fiber 12 and the second optical fiber 14. The coupler 44 receives the optical signal from the first fiber 12 and distributes the optical signal to N number of the second fibers 14. Schematically seen in FIG. 1, optical fiber coupler 44 includes an input operatively coupled to the first optical fiber 12 to receive the optical signal and sixteen outputs to distribute the optical signal to sixteen second optical fibers 14. This particular number is not intended to be a limitation of the number of second optical fibers 14 which may be utilized. Any size array of second fibers 14 and photodiodes 22 may be used in practicing the present invention.

The variable optical energy delay line 10 of the present invention in one particular embodiment is useful for providing the delay of radio frequency (RF) signals. A source 46 of optical energy is responsive to an input RF signal to modulate optical energy to develop the optical signal. The optical energy developed by the source 46 may be developed typically by direct modulation or by an externally modulated laser. This optical signal is then applied to the first optical fiber 12 of the variable delay line 10, delay line 10 variably delaying the optical signal as described hereinabove. After the optical signal is transmitted through the second fibers 14, the selected photodiode 22 demodulates the optical signal subsequent to the optical signal being delayed to develop an output RF signal from the optical signal from the selected one of the second fibers 14 as hereinabove described. The output RF signal is coupled to an FET RF amplifier 48 coupled to the termination of the output segment 42c of the waveguide 42. In the presently described embodiment, RF amplifier 48 provides for gain in the delay line to eliminate insertion loss.

Figure 4A:
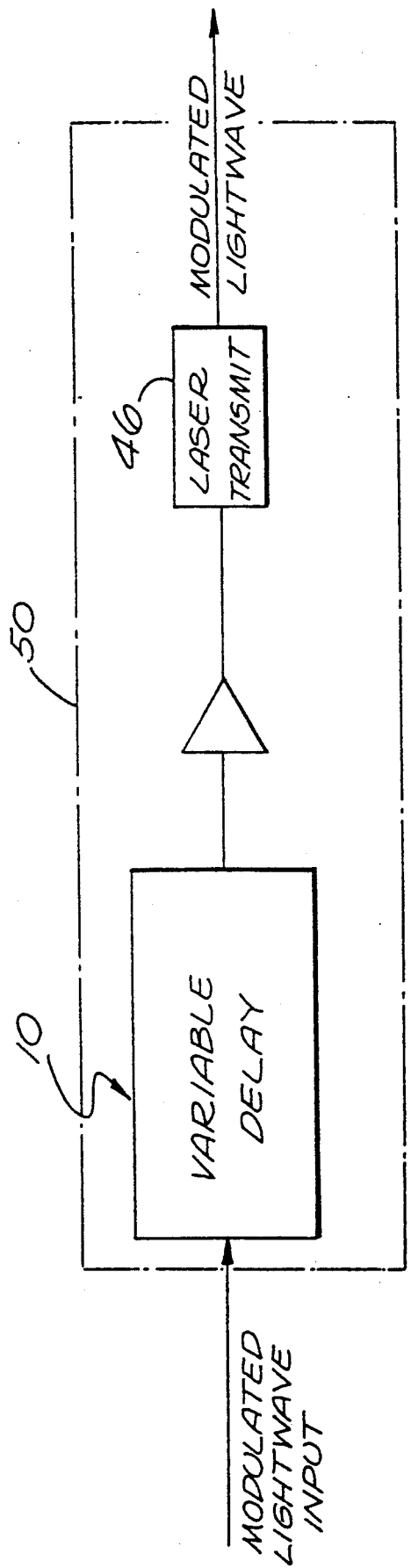
FIG. 4A and FIG. 4B illustrate cascade coupling of the delay line of FIG. 1 to achieve longer delays.
Figure 4B:
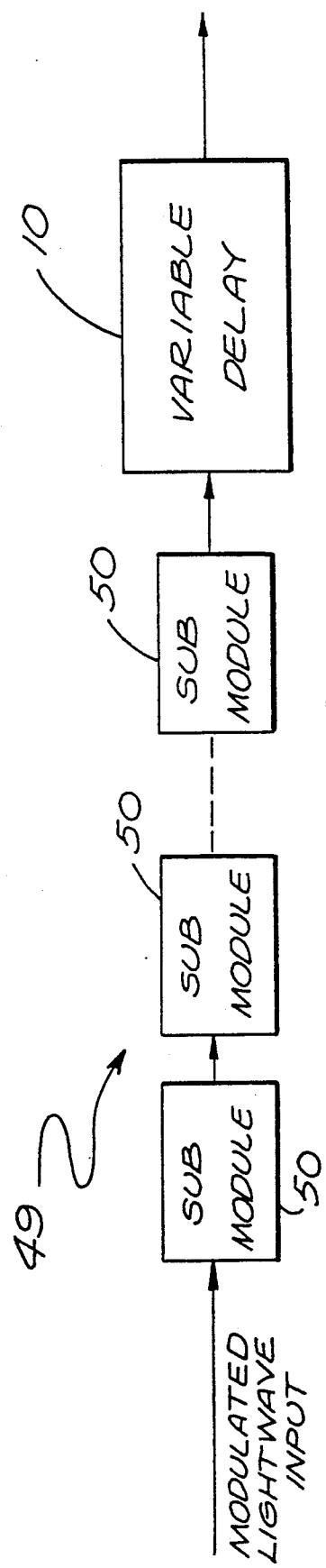

With further reference to FIGS. 4A and 4B, a further embodiment of a variable optical energy delay line 49 may be constructed from a plurality of cascade coupled delay modules 50, each of the module 50 having an input for receiving an optical signal and an output for transmitting a delayed optical signal the output of one module 50 being optically coupled to the input of the next subsequent module 50.

Each of the delay modules 50 includes means responsive to the optical signal received at its input for variably delaying the optical signal, means for developing an electrical signal from the optical signal subsequent to the optical signal being delayed, and means responsive to the electrical signal for developing a delayed optical signal.

The variably delaying means of the module 50 includes the first fiber 12 and the plurality of second fibers 14 of the delay line 10 as hereinabove described. The electrical signal developing means of the module 50 includes the opto-electric switching means 20 as hereinabove described. Thus, the delay line 10 as described hereinabove comprises the variably delaying means and the electrical signal developing means of the delay line 49. The electrical signal may then be applied to an FET RF amplifier 48 as described hereinabove. The delayed RF output of the amplifier 48 modulates a source of optical energy which is similar to source 46 described hereinabove to couple the delayed optical signal to the next module 50 which utilizes it. The delay line 49 may be used in a pure optical form by cascading modules 50. Furthermore, delay line 49 may have the source 46 of RF modulated optical energy as a pre-stage when used in an RF delay system to achieve long RF delays. In the RF application, the delay line 49 may be terminated by a delay line 10 as hereinabove described to obtain an RF output. The delay line 49 may also be terminated by an electrical analog variable delay line as described in a commonly owned, co-pending application Ser. No. 07/329,997 to J. E. Mantele, now U.S. Pat. No. 5,014,023. The delay line 47 (as in FIG. 1) described therein will allow one to achieve a fine tuned analog RF true time delay by fine tuning and calibration of the optical delay line.

Figure 5:
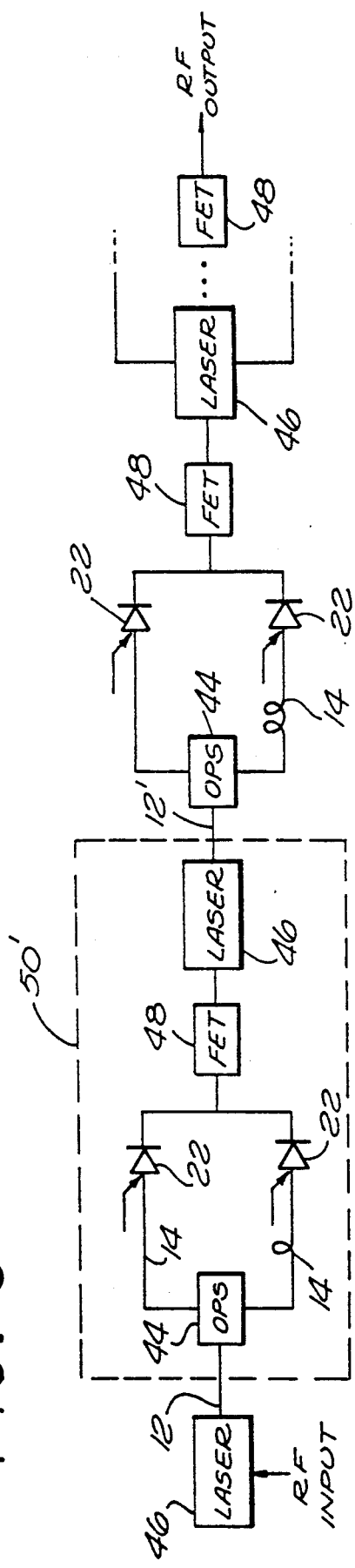
FIG. 5 illustrates an alternate embodiment to the cascade coupling of FIG. 4B.

Referring now to FIG. 5, there is shown a delay module 50' constructed as an alternate embodiment to the delay module 50 hereinabove described in conjunction with delay line 49. The variably delaying means of the module 50' includes the first fiber 12 and a pair of second fibers 14. Each of these second fibers are adapted to receive the optical signal from the first optical fiber 12 and to transmit further the optical signal along each of the second optical fibers 14. As described hereinabove, each of the second optical fibers 14 have a predetermined length. The modification to the module 50' is that one of the second optical fibers 14 in each of the modules 50' has the substantially identical length to each other. The other of the second optical fibers 14 in each of the modules 50' has a length substantially twice the predetermined length of the other of the second optical fiber 14 in a prior one of the modules 50'. Thus, each successive module 50' may be selected such that there is no delay through such module 50' or a selected delay therethrough which is twice the delay of the prior module 50' if delay is selected therein. Otherwise, the alternate module 50' functions as hereinabove described with respect to module 50 wherein identical reference numerals in FIG. 5 refer to the similar reference numerals shown in FIG. 4B and such elements identified by the same reference numerals are identical.

Figure 6:
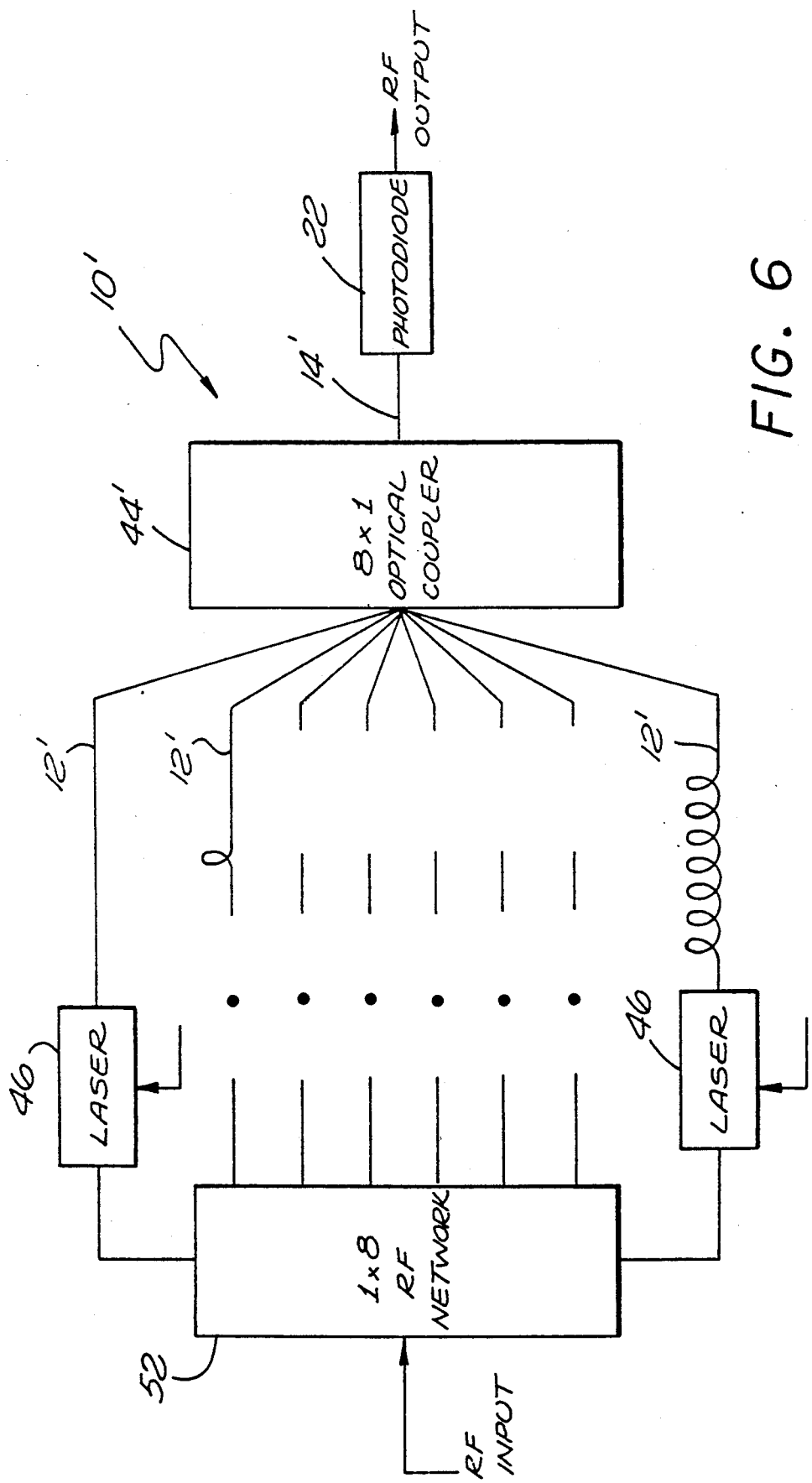
FIG. 6 is an alternate embodiment of a variable delay line constructed according to the principles of the present invention.

Referring now to FIG. 6, there is shown an alternate variable optical energy delay line 10' constructed according to the principals of the present invention. The delay line 10' includes means for developing an optical signal, such as the source 46 of optical energies hereinabove described, a plurality of first optical fibers 12' and a second optical fiber 14'.

The plurality of first optical fibers 12' each have a predetermined length, the predetermined length of each of the first optical fibers 12' being different from the predetermined length of all other of the first optical fibers 12'. A selected one of the first optical fibers 12' is selected to transmit the optical signal. The predetermined length of the selected one of the first optical fibers 12' determines the propagation delay of the optical signal. The second optical fiber 14' is operatively coupled to each of the first optical fibers 12' and adapted to receive the optical signal from the selected one of the first optical fibers 12'.

Similarly to hereinabove described, the delay line 10' further includes means for coupling the optical signal from the second optical fiber 14' through a device which utilizes one of the optical signal and an electrical analog of the optical signal. Accordingly, the coupling means includes the opto-electrical switching means as hereinabove described wherein a single photodiode 22 is associated with the second optical fiber 14'. The photodiode 22 develops the electrical signal in response to the optical signal on the second optical fiber 14' as hereinabove described. For example, the photodiode 22 may be maintained in a reverse biased state to be made responsive to the optical signal incident thereon.

To couple the first optical fibers 12' to the second optical fiber 14', a N:1 optical fiber coupler 44' may be provided. The optical fiber coupler 44' receives the optical signal from the selected one of the first optical fibers 12' and distributes the optical signal to the second optical fiber 14'.

The developing means to develop the optical signal may include a source 46 of optical energy associated with each one of the first optical fibers 12'. Each source 46 is adapted to develop the optical signal. Means are also provided for enabling the source 46 associated with the selected one of the first optical fibers 12' to develop the optical signal. Accordingly, each source 46 may be connected to a switching network such as described hereinabove in conjunction with the photodiodes 22 to turn on the source 46.

The delay line 10' is also useful to provide a delay of an RF signal. For example, an RF input may be applied to a 1:N RF network 52 to deliver the RF input signal to each of the sources 46. One source 46 is then enabled to develop the optical signal as hereinabove described to provide the delay. Furthermore, the photodiode 22 demodulates the optical signal on the second optical fiber 14' to develop the RF output, as hereinabove described with reference to delay line 10.

Figure 7:
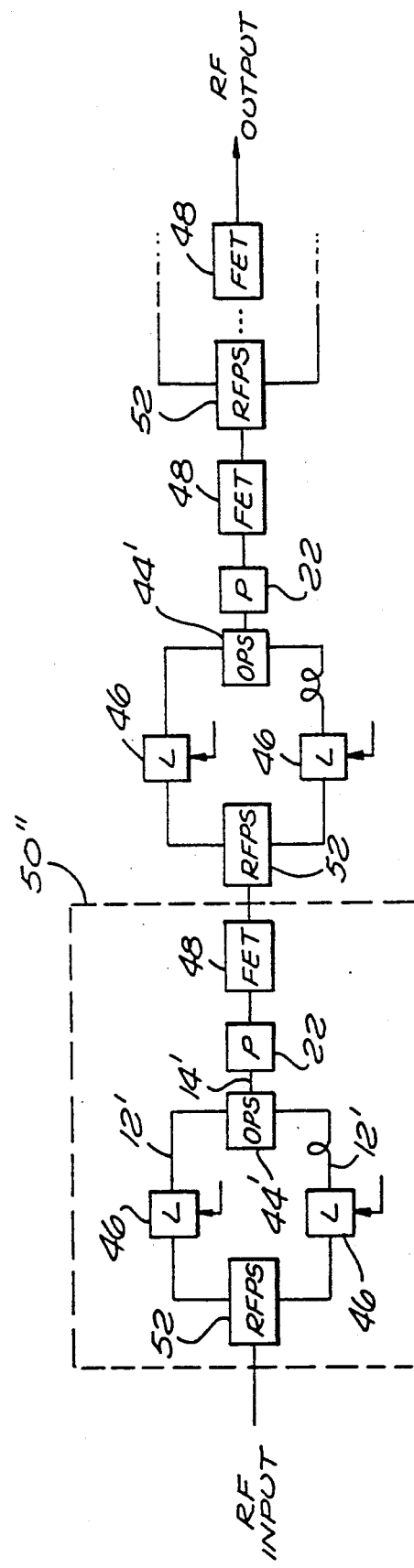
FIG. 7 illustrates cascade coupling of the alternate embodiment of the delay line of the present invention similarly to FIG. 5.

Referring now to FIG. 7, a variable optical energy delay line may be constructed from a plurality of cascade couple delay modules 50". Each of the modules 50" has an input for receiving an RF signal and an output for transmitting a delayed RF signal. An output of at least one of the modules 50" is electrically coupled to an input of at least a further one of the modules 50".

Each of the modules 50" includes means responsive to the RF signal for developing an optical signal, means for developing said delayed RF signal from the optical signal, means for variably delaying the optical signal, and means for developing the delayed RF signal from the optical signal subsequent to the optical signal being delayed. In a similar arrangement as hereinabove described with reference to FIG. 5, each delay module 50" may include a pair of first optical fibers 12', each of the first optical fibers 12' having a predetermined length. One of the first optical fibers 12' in each of the modules 50" has a substantially identical length to each other. One other of the first optical fibers 12' in each of the modules 50" has a length substantially twice the predetermined length of the other one of the first optical fibers 12' in a prior one of the modules 50". A selected one of the first optical fibers 12' is selected to transmit the optical signal through each of the modules 50". The predetermined length of the selected one of the first optical fibers 12' determines a propogation delay of the optical signal through such modules 50".

FIGS. 5 and 7 illustrate a quasi-binary approach to choosing a selected delay through the delay line constructed from modules 50' and 50". All other elements shown in FIG. 7 function as hereinabove described wherein numerals in FIG. 7 refer to the similar reference numerals in all other figures and such elements identified by the same reference numerals are identical.

There has been described hereinabove a novel optical energy delay line constructed according to the principles of the present invention. Those skilled in the art may now make numerous usage of and departure from the above-described embodiments of the present invention is to be defined solely by the scope of the following claims.

What is claimed is:

1. A variable optical energy delay line comprising:
   a first optical fiber to transmit an optical signal;
   a plurality of second optical fibers adapted to receive said optical signal from said first optical fiber and to transmit further said optical signal along each of said second optical fibers, each of said second optical fibers having a predetermined length, said predetermined length of each of said second optical fibers being different from said predetermined length of all other of said second optical fibers, said predetermined length determining a propagation delay of said optical signal along each of said second fibers;
   means for coupling said optical signal from a selected one of said second optical fibers to a device which utilizes one of said optical signal and an electrical analog of said optical signal, said selected one of said second optical fibers being selected for said propagation delay associated therewith; and
   an electrical analog variable delay line coupled to said device to delay said optical signal by a continuous variable amount of delay so as to achieve a fine-tuned analog RF true time delay for fine tuning said optical delay line.

2. A delay line as set forth in claim 1 wherein said coupling means includes opto-electric switching means for developing an electrical signal from said optical signal received from said selected one of said second optical fibers.

3. A delay line as set forth in claim 2 wherein said opto-electric switching means includes:
   a plurality of photodiodes each of said photodiodes being associated with a respective one of said second optical fibers, one of said photodiodes developing said electrical signal when made responsive to said optical signal on said selected one of said second optical fibers associated therewith; and
   control means for enabling said one of said photodiodes associated with said selected one of said optical fibers to be responsive to said optical signal.

4. A delay line as set forth in claim 3 wherein said control means includes:
   a plurality of transistor switches, one of said transistor switches being operatively coupled to a respective one of said photodiodes, said one of said transistor switches when on enabling said respective one of said photodiodes coupled thereto to develop said electrical signal, said one of said transistor switches being selectively turned on and off by a control signal identifying said selected one of said second optical fiber.

5. A delay line as set forth in claim 1 further comprising:
   a 1:N optical fiber coupler operatively coupled between said first optical fiber and said plurality of second optical fibers, said optical fiber coupler receiving said optical signal from said first fiber and distributing said optical signal to N number of said second optical fibers.

6. A variable optical energy delay line comprising:
   means responsive to an RF signal for modulating optical energy as a function of said RF signal to develop an optical signal,
   a plurality of first optical fibers, each of said first optical fibers having a predetermined length, said predetermined length of each of said first optical fibers being different from said predetermined length of all other of said first optical fibers, s selected one of said first optical fibers being selected to transmit said optical signal, said predetermined length of said selected one of said first optical fibers determining a propagation delay of said optical signal;
   a second optical fiber operatively coupled to each of said first optical fibers and adapted to receive said optical signal from said selected one of said first optical fibers; and
   means for coupling said optical signal from said second optical fiber to a device which utilizes one of said optical signal and an electrical analog of said optical signal and an electrical analog variable delay line coupled to said device to delay said optical signal by a continuous variable amount of delay so as to achieve a fine-tuned analog RF true time delay for fine tuning said optical delay line.

7. A delay line as set forth in claim 6 wherein said coupling means includes opto-electric switching means for developing an electrical signal from said optical signal received from said second optical fiber.

8. A delay line as set forth in claim 7 wherein said opto-electric switching means includes:
a photodiode being associated with said second optical fiber, said photodiode developing said electrical signal in response to said optical signal on said second optical fiber.

9. A delay line as set forth in claim 6 further comprising:
a N:1 optical fiber coupler operatively coupled between said plurality of first optical fibers and said second optical fiber, said optical fiber coupler receiving said optical signal from said selected one of said first fibers and distributing said optical signal to said second optical fiber.

10. A delay line as set forth in claim 6 wherein said developing means includes:
a source of optical energy associated with each one of said first optical fibers, each source being adapted to develop said optical signal; and
means for enabling said source associated with said selected one of said first optical fibers to develop said optical signal.

11. A variable optical energy delay line comprising:
a plurality of cascade coupled delay modules, each of said modules having an input for receiving an optical signal and an output for transmitting a delayed optical signal, an output of at least one of said modules being optically coupled to an input of at least a further one of said modules, each of said modules including;
means responsive to said optical signal received at said input for variably delaying said optical signal;
means for developing an electrical signal from said optical signal subsequent to said optical signal being delayed; and
means responsive to said electrical signal for developing said delayed optical signal.

12. A delay line as set forth in claim 11 wherein said delaying means includes:
a first optical fiber to transmit said optical signal; and
a plurality of second optical fibers adapted to receive said optical signal from said first optical fiber and to transmit further said optical signal along each of said second optical fibers, each of said second optical fibers having a predetermined length, said predetermined length of each of said second optical fibers being different from said predetermined length of all other of said second optical fibers, said predetermined length determining a propagation delay of said optical signal along each of said second fibers.

13. A delay line as set forth in claim 12 wherein said electrical signal developing means includes opto-electric switching means for developing said electrical signal from said optical signal received from a selected one of said second optical fibers, said selected one of said second optical fibers being selected for said propagation delay associated therewith.

14. A delay line as set forth in claim 13 wherein said opto-electric switching means includes:
a plurality of photodiodes, each of said photodiodes being associated with respective one of said second optical fibers, one of said photodiodes developing said electrical signal when made responsive to said optical signal on said selected one of said second optical fibers associated therewith; and
control means for enabling said one of said photodiode detectors associated with said selected one of said optical fibers to be responsive to said optical signal.

15. A delay line as set forth in claim 14 wherein said control means includes:
a plurality of transistor switches, one of said transistor switches being operatively coupled to a respective one of said photodiode detectors, said switch when on enabling said respective one of said photodiodes coupled thereto to develop said electrical signal as said analog of said optical signal, said transistor switch being selectively turned on by a control signal identifying said selected one of said second optical fibers.

16. A delay line as set forth in claim 12 further comprising:
a 1:N optical fiber coupler operatively coupled between said first optical fiber and said plurality of second optical fibers, said optical fiber coupler receiving said optical signal from said first fiber and distributing said optical signal to N number of said second optical fibers.

17. A delay line as set forth in claim 11 wherein said delayed optical signal developing means includes means for modulating optical energy as a function of said electrical signal to develop said delayed optical signal.

18. A delay line as set forth in claim 11 wherein said delaying means includes:
a first optical fiber to transmit said optical signal; and
a pair of second optical fibers adapted to receive said optical signal from said first optical fiber and to transmit further said optical signal along each of said second optical fibers, each of said second optical fibers having a predetermined length, one of said second optical fibers in each of said modules having a substantially identical length to each other, one other of said second optical fibers in each of said modules having a length substantially twice said predetermined length of said one other of said second optical fibers in a prior one of said modules, said predetermined length determining a propagation delay of said optical signal along each of said second fibers.

19. A delay line as set forth in claim 18 wherein said electrical signal developing means includes opto-electric switching means for developing said electrical signal from said optical signal received from a selected one of said second optical fibers, said selected one of said second optical fibers being selected for said propagation delay associated therewith.

20. A delay line as set forth in claim 19 wherein said opto-electric switching means includes;
a pair of photodiodes, each of said photodiodes being associated with respective one of said pair of second optical fibers, one of said photodiodes developing said electrical signal when made responsive to said optical signal on said selected one of said second optical fibers associated therewith; and
control means for enabling said one of said photodiode detectors associated with said selected one of said optical fibers to be responsive to said optical signal.

21. A delay line as set forth in claim 20 wherein said control means includes:
a pair of transistor switches, one of said transistor switches being operatively coupled to a respective one of said photodiodes, said switch when on enabling said respective one of said photodiodes coupled thereto to develop said electrical signal as said analog of said optical signal, said transistor switch being selectively turned on by a control signal identifying said selected one of said second optical fibers.

22. A delay line as set forth in claim 18 further comprising:
a 1:2 optical fiber coupler operatively coupled between said first optical fiber and said pair of second optical fibers, said optical fiber coupler receiving said optical signal from said first fiber and distributing said optical signal to said pair of second optical fibers.

23. A variable optical energy delay line comprising:
means responsive to an input RF signal for modulating optical energy as a function of said RF signal to develop an optical signal;
means for variably delaying said optical signal;
means for demodulating said optical signal subsequent to said optical signal being delayed to develop an output RF signal;
an RF amplifier to amplify said output RF signal; and
an electrical analog variable delay line coupled to said demodulating means to delay said signal by a continuous variable amount of delay so as to achieve a fine-tuned analog RF true time delay for fine tuning said optical delay line.

24. A variable optical energy delay line includes comprising:
means responsive to an input RF signal for modulating optical energy as a function of said RF signal to develop an optical signal;
a first optical fiber to transmit said optical signal;
a plurality of second optical fibers adapted to receive said optical signal from said first optical from said first optical fiber and to transmit further said optical signal along each of said second fibers, each of said second optical fibers having a predetermined length, said predetermined length of each of said optical fibers being different from said predetermined length of all other said optical fibers, said predetermined length determining a propagation delay of said optical signal along each of said second fibers; and
means for demodulating said optical signal subsequent to said optical signal being delay to develop an output RF signal and an electrical analog variable delay line coupled to said demodulating means to delay said optical signal by a continuous variable amount of delay so as to achieve a fine-tuned analog RF true time delay for fine tuning said optical delay line.

25. A delay line as set forth in claim 24 wherein said demodulating means includes opto-electric switching means for developing said output RF signal from said optical signal received from a selected one of said second optical fibers, said selected one of said second optical fibers being selected for said propagation delay associated therewith.

26. A delay line as set forth in claim 25 wherein said opto-electric switching means include:
a plurality of photodiodes, each of said photodiodes being associated with a respective one of said second optical fibers, one of said photodiodes developing said electrical signal when made responsive to said optical signal on said selected one of said second optical fibers associated therewith:
control means for enabling said one of said photodiodes associated with said selected one of said optical fibers to be responsive to said optical signal.

27. A delay line as set forth in claim 26 wherein said control means includes:
a plurality of transistor switches, one of said transistor switches being operatively coupled to a respective one of said photodiodes, said switch when on enabling said respective one of said photodiodes coupled thereto to develop said electrical signal, said transistor switch being selectively turned on by a control signal identifying said selected one of said second optical fibers.

28. A delay line as set forth in claim 24 further comprising:
a 1;N optical fiber coupler operatively coupled between said first optical fiber and said plurality of second optical fibers, said optical fiber coupler receiving said optical signal from said first fiber and distributing said optical signal to N number of said second optical fibers.

29. A variable optical energy delay line comprising:
means responsive to an input RF signal for modulating optical energy as a function of said RF signal to develop an optical signal;
a plurality of first optical fibers, each of said first optical fibers having a predetermined length, said predetermined length of each of first optical fibers being different from said predetermined length of all other of said first optical fibers, a selected one of said first optical fibers being selected to transmit said optical signal, said predetermined length of said selected one of said first optical fibers determining a propagation delay of said optical signal;
a second optical fiber operatively coupled to each of said first optical fibers and adapted to receive said optical signal from said selected one of said first optical fibers; and
means for demodulating said optical signal subsequent to said optical signal being delayed to develop an output RF signal and an electrical analog variable delay line coupled to said demodulating means to delay said optical signal by a continuous variable amount of delay so as to achieve a fine-tuned analog RF true time delay for fine tuning said optical delay line.

30. A delay line as set forth in claim 29 wherein said demodulating means includes opto-electric switching means for developing an electrical signal from said optical signal received from said second optical fiber.

31. A delay line as set forth in claim 30 wherein said opto-electric switching means includes:
a photodiode being associated with said second optical fiber, said photodiode developing said electrical signal in response to said optical signal on said second optical fiber.

32. A delay line as set forth in claim 29 further comprising:
a N:1 optical fiber coupler operatively coupled between said plurality of first optical fibers and said second optical fiber, said optical fiber coupler receiving said optical signal from said selected one of said first fibers and distributing said optical signal to said second optical fiber.

33. A delay line as set forth in claim 29 wherein said modulating means includes:
a source of optical energy associated with each one of said first optical fibers, each source being adapted to develop said optical signal; and
means for enabling said source associated with said selected one of said first optical fibers to develop said optical signal.

34. A variable optical energy delay line comprising:
a plurality of cascade coupled delay modules, each of said modules having an input for receiving a RF signal and an output for transmitting a delayed RF signal, an output of at least one of said modules being electrically coupled to an input of at least a further one of said modules, each of said modules including;
means responsive to said RF signal for developing an optical signal;
means for variably delaying said optical signal; and
means for developing said delayed RF signal from said optical signal subsequent to said optical signal being delayed.

35. A variable optical energy delay line as set forth in claim 34 wherein said variably delaying means includes:
a pair of first optical fibers, each of said first optical fibers having a predetermined length, one of said first optical fibers in each of said modules having a substantially identical length to each other, one other of said first optical fibers in each of said modules having a length substantially twice said predetermined length of said one other of said first optical fiber in a prior one of said modules, a selected one of said first optical fibers being selected to transmit said optical signal, said predetermined length of said selected one of said first optical fibers determining a propagation delay of said optical signal; and
a second optical fiber operatively coupled to each of said first optical fibers and adapted to receive said optical signal from said selected one of said first optical fibers.

36. A delay line as set forth in claim 35 wherein said delayed RF signal developing means includes opto-electric switching means for developing said delayed RF signal from said optical signal received from said second optical fiber.

37. A delay line as set forth in claim 36 wherein said opto-electric switching means includes:
a photodiode being associated with said second optical fiber, said photodiode developing said delayed RF signal in response to said optical signal on said second optical fiber.

38. A delay line as set forth in claim 35 further comprising:
a 2:1 optical fiber coupler operatively coupled between said pair of first optical fibers and said second optical fiber, said optical fiber coupler receiving said optical signal from said selected one of said first fibers and distributing said optical signal to said second optical fiber.

39. A delay line as set forth in claim 34 wherein said optical signal developing means includes:
a source of optical energy associated with each one of said first optical fibers, each source being adapted to develop said optical signal; and
means for enabling said source associated with said selected one of said first optical fibers to develop said optical signal.

* * * * *